United States Patent
Gosal et al.

(10) Patent No.: US 9,491,704 B2
(45) Date of Patent: Nov. 8, 2016

(54) METHODS AND APPARATUS FOR CONTROLLING POWER CONSUMPTION IN AN ELECTRONIC DEVICE WITH A COMMUNICATION SUBSYSTEM

(75) Inventors: Manpreet Kaur Gosal, Guelph (CA); Nils Patrik Lahti, Ottawa (CA)

(73) Assignees: BlackBerry Limited, Waterloo (CA); 2236008 Ontario Inc., Waterloo (CA)

(*) Notice: Subject to any disclaimer, the term of this patent is extended or adjusted under 35 U.S.C. 154(b) by 34 days.

(21) Appl. No.: 13/428,318

(22) Filed: Mar. 23, 2012

(65) Prior Publication Data
US 2013/0250825 A1  Sep. 26, 2013

(51) Int. Cl.
*H04W 52/02* (2009.01)

(52) U.S. Cl.
CPC ........... *H04W 52/0232* (2013.01); *Y02B 60/50* (2013.01)

(58) Field of Classification Search
CPC ............... H04W 52/02; H04W 84/12; H04W 52/0203; H04W 4/20
USPC .......................................... 370/311; 455/574
See application file for complete search history.

(56) References Cited

U.S. PATENT DOCUMENTS

| | | | |
|---|---|---|---|
| 5,192,919 A | | 3/1993 | Wieczorek |
| 6,718,164 B1 | | 4/2004 | Korneluk et al. |
| 6,773,404 B2* | | 8/2004 | Poezevera et al. ........... 600/534 |
| 7,904,023 B2 | | 3/2011 | Viitamaki et al. |
| 7,992,026 B2 | | 8/2011 | Eade et al. |
| 8,060,054 B1* | | 11/2011 | Dinan et al. ............... 455/343.4 |
| 8,063,869 B2 | | 11/2011 | Drader et al. |
| 8,412,866 B2* | | 4/2013 | Weng .................... G06F 1/3203 710/52 |
| 8,422,365 B2* | | 4/2013 | Phillips et al. ............... 370/229 |
| 8,611,268 B1* | | 12/2013 | Thandaveswaran .......... 370/311 |
| 2003/0087615 A1 | | 5/2003 | Randall |
| 2004/0264397 A1 | | 12/2004 | Benveniste |
| 2006/0030307 A1* | | 2/2006 | Cadieux et al. .............. 455/418 |
| 2006/0083168 A1 | | 4/2006 | Prakash |
| 2006/0160508 A1 | | 7/2006 | Narayanaswami et al. |
| 2007/0230418 A1 | | 10/2007 | Takeuchi et al. |
| 2007/0238438 A1 | | 10/2007 | Alon et al. |
| 2008/0205316 A1* | | 8/2008 | Minematsu et al. .......... 370/310 |
| 2009/0287948 A1* | | 11/2009 | Chary ........................ 713/324 |
| 2010/0128645 A1* | | 5/2010 | Lin et al. ...................... 370/311 |
| 2010/0191992 A1* | | 7/2010 | Shen ..................... G06F 1/3215 713/320 |
| 2010/0287390 A1* | | 11/2010 | Yu .................................. 713/310 |
| 2010/0304794 A1 | | 12/2010 | Beninghaus et al. |

(Continued)

FOREIGN PATENT DOCUMENTS

| | | |
|---|---|---|
| EP | 1513295 A2 | 3/2005 |
| EP | 2267989 A3 | 4/2011 |
| WO | 0247321 A2 | 6/2002 |

OTHER PUBLICATIONS

European Search Report & Written Opinion for EP patent application #12161084.4, Jul. 2, 2012.

(Continued)

*Primary Examiner* — Chandrahas Patel
*Assistant Examiner* — Lan Huong Truong
(74) *Attorney, Agent, or Firm* — Ridout and Maybee LLP

(57) ABSTRACT

An electronic device has a communication subsystem with a power saving mode and an active mode. The communication subsystem is set to switch between the power saving mode and the active mode depending on thresholds of communication traffic. The settings for the thresholds depend on the activity detected on the electronic device.

19 Claims, 7 Drawing Sheets

(56) References Cited

U.S. PATENT DOCUMENTS

| | | | |
|---|---|---|---|
| 2011/0105096 A1* | 5/2011 | Dods et al. | 455/418 |
| 2011/0116427 A1* | 5/2011 | Chang et al. | 370/311 |
| 2011/0158143 A1* | 6/2011 | Yun | H04W 52/0251 370/311 |
| 2012/0173889 A1* | 7/2012 | Wong | G06F 1/3203 713/300 |
| 2013/0143504 A1* | 6/2013 | Devara | H04W 52/0258 455/67.11 |

OTHER PUBLICATIONS

Li, Mei—Canadian Intellectual Property Office, "Examiner's Requisition" for Canadian Patent Application No. 2,772,368 dated Jan. 28, 2014.

Li, Mei—Canadian Intellectual Property Office, "Examiner's Requisition" for corresponding Canadian Patent Application No. 2,772,368 dated Apr. 7, 2015, Canada.

\* cited by examiner

METHODS AND APPARATUS FOR CONTROLLING POWER CONSUMPTION IN AN ELECTRONIC DEVICE WITH A COMMUNICATION SUBSYSTEM

BACKGROUND

1. Field of the Technology

The present disclosure relates generally to electronic devices configured to operate for communications in a wireless communication network, such as a wireless local area network or "WLAN".

2. Description of the Related Art

An electronic device or a mobile communication device may be configured for communications in different types of wireless communication networks, such as a wireless local area network (WLAN) (e.g. IEEE 802.11 based wireless network). Such devices typically have limited battery capacity and to conserve battery power, the devices may communicate with the wireless communication network in a power saving mode instead of an active mode. However, power saving mode communications typically has less bandwidth and more latency then active mode communications.

What are needed are methods and apparatus which improve these and other related or similar shortcomings of the prior art.

BRIEF DESCRIPTION OF THE DRAWINGS

Reference will now be made to the drawings, which show by way of example, embodiments of the present disclosure. Note that, throughout the appended drawings, like features are identified by like reference numerals.

DETAILED DESCRIPTION OF THE EMBODIMENTS

Figure 1:
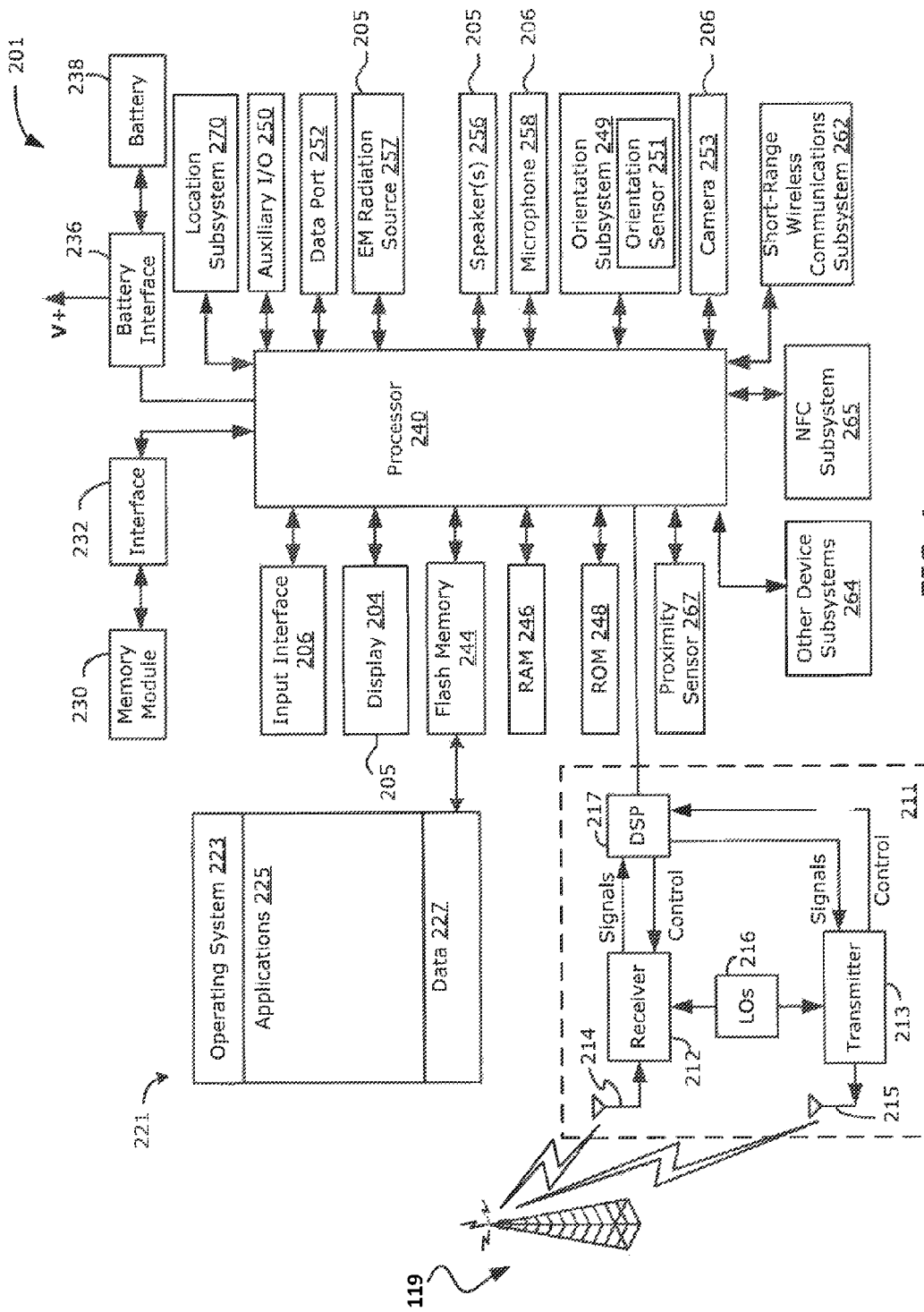
FIG. 1 is an example of a schematic block diagram of an electronic device with a wireless communication subsystem.

Reference will now be made to FIG. 1 which illustrates an example electronic device 201 in which example embodiments described in the present disclosure can be applied. The electronic device 201 is a communication device and, more particularly, is a mobile communication device having data and voice communication capabilities, and the capability to communicate with other computer systems; for example, via the Internet. It will, however, be appreciated that the electronic device 201 may take other forms, including any one of the forms listed below.

Depending on the functionality provided by the electronic device 201 in various example embodiments, the electronic device 201 may be a multiple-mode communication device configured for both data and voice communication, a mobile telephone such as a Smartphone, a wearable computers such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processor 240 (such as a microprocessor) which controls the overall operation of the electronic device 201. The processor 240 interacts with device subsystems such as a wireless communication subsystem 211 for exchanging radio frequency signals with a wireless network 119 to perform communication functions. The processor 240 is communicably coupled with additional device subsystems including one or more output interfaces 205 (such as a display 204 and/or a speaker 256 and/or electromagnetic (EM) radiation source 257), one or more input interfaces 206 (such as a camera 253, microphone 258, keyboard (not shown), control buttons (not shown), a navigational input device (not shown), and/or a touch-sensitive overlay (not shown)) associated with a touch screen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In the present embodiment, the wireless network 119 is a wireless local area network (WLAN) and the wireless communication subsystem 211 includes modules and processes which operate in accordance with IEEE 802.11 for communications. Wireless communication subsystem 211 may be or include what is referred to as a WLAN driver, with which microprocessor 138 may communicate and control.

Short-range wireless communications subsystem 262 may provide for communication between the electronic device 201 and different systems or devices, which need not necessarily be similar devices. For example, the subsystem 262 may include an infrared device and associated circuits and components or a Bluetooth™ communication module to provide for communication with similarly enabled systems and devices.

A WLAN according to the standard IEEE 802.11 has a Constantly Awake Mode or Constantly Active Mode or Active Mode (AM), where the radio, for example wireless communication subsystem 211, is constantly on to receive or transmit packets, and generally power saving features are not enabled. In AM, the wireless communication subsystem 211 uses more power then, for example, power-save polling mode or Power Save Mode or Power Saving Mode (PSM)

which the suspends the radio activity after a variable but pre-determined period of inactivity, and then wakes up periodically to see if the infrastructure, for example access point, has queued any traffic or packets for it. If there is traffic, then the radio stays awake to receive it. When the wireless communication subsystem 211 is in PSM, the access point the device 201 is associated with will buffer downlink frames instead of directly sending them to the device 201 and the device 201 will thus will only receive downlink traffic at intermittent intervals (e.g. beacon intervals).

Typically, the PSM has reduced performance in terms of throughput and increased latency in delivery as compared to the AM. In PSM, there may also be a range of power saving depend on the length of time (for example beacons) the radio is suspended, off, or sleeping. The longer the radio is suspended, or off, the more the power savings or the lower the power usage rate. Although the present embodiment relates to the PSM of the IEEE 802.11 standards, any suitable power saving method may be utilized including Unscheduled Automatic Power Save Delivery (U-APSD), Wi-Fi Multimedia Power Save (WMM-PS), Power Save Multi-Poll (PSMP), Spatial Multiplexing (SM) Power Save, and Dynamic Multiple-Input and Multiple-Output (MIMO) Power Save.

Again, the WLAN may be an IEEE 802.11-based wireless network which provides communications for mobile device 102 in accordance with IEEE 802.11 standards. Although the present embodiment relates to a WLAN of the IEEE 802.11 type, any suitable wireless communication technologies with active modes and power saving modes may be utilized, such as Wireless Metropolitan Area Networks (WiMAX) technologies (e.g. IEEE 802.16e-based technologies) and Wireless Personal Area Networks (ZigBee) based on the IEEE 802.15.4 standard. Even further, IEEE 802.15, a standardization of Bluetooth (BT) wireless specification defined by IEEE, is for wireless personal area networks (WPANs). A further example of a WPAN is Zigbee based on the IEEE 802.15.4 standard. The IEEE 802.15 type standard has characteristics such as short-range, low power, low cost, small networks and communication of devices operating within a Personal Operating Space. A BT device in the Connection State has an Active Mode (actively participates in a channel) and power saving modes (Park mode, Hold Mode, and Sniff Mode). The Sniff Mode has the highest duty cycle, the highest power usage rate, of all 3 power saving modes (sniff, hold & park). The Hold Mode has an intermediate duty cycle, the medium power usage rate, of the 3 power saving modes. The Park Mode has the lowest duty cycle, the least power usage rate, of the 3 power saving modes.

Although the present embodiment has been described as an Active Mode (AM) and a Power Saving mode (PSM) for simplicity and clarity of illustration; it is understood that an Active Mode (AM) includes a power saving mode which uses more power, or has a higher power usage rate, then the power saving mode of the Power Saving Mode (PSM). In an example embodiment with the wireless communication subsystem 211 using BT, an Active Mode (AM) may be set in Sniff Mode while a Power Saving Mode (PSM) may be set in the Park Mode.

In a further example embodiment, the anticipated data traffic of electronic device 201 is high, for example, when the electronic device 201 has the Display 204 active (or on) and a web browser application also active (or opened); the wireless communication subsystem 211 using Dynamic MIMO Power Save in 802.11n may set the Active Mode (AM) to a radio configuration of 4×4 and the Power Saving Mode (PSM) to a radio configuration of 2×2. The anticipated data traffic is lower when only the Display 204 is active and the browser application is not active; for this state, the wireless communication subsystem 211 may set the Active Mode (AM) to a radio configuration of 3×3 and the Power Saving Mode (PSM) to a radio configuration of 1×1. However, the anticipated data traffic is lowest (of these examples) when the Display 204 is not active (or off), the wireless communication subsystem 211 may set the Active Mode (AM) to a radio configuration of 2×2 and the Power Saving Mode (PSM) to a radio configuration of 1×1. This is just one example embodiment showing one trade off between power usage versus performance (such as lower latency). It will be appreciated that there are a number of alternative embodiments such as where the electronic device 201 is configured for more aggressive in power usage and better performance with 4×4 in all AM states.

Note that the device 201 may be additionally configured for communications with cellular telecommunications networks (e.g. as a cellular telephone device and/or cellular data communication device). For communication with cellular networks, device 201 may be configured in accordance with one or more cellular telecommunication standards, such as Global Systems for Mobile (GSM) and/or General Packet Radio Service (GPRS) standards. However, such device 201 may additionally or alternatively operate in accordance with other such standards, such as Enhanced Data rates for GSM Evolution (EDGE) or Enhanced GPRS (EGPRS), Universal Mobile Telecommunications System (UMTS), Long-Term Evolution (LTE), or EVolution-Data Only (EV-DO) (for CDMA) technologies, as a few examples.

In at least some example embodiments, the electronic device 201 may include a touch screen display which acts as both an input interface 206 (i.e. touch-sensitive overlay) and an output interface 205 (i.e. display). The touch screen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. In at least some example embodiments, the touch-sensitive overlay may have a touch-sensitive input surface which is larger than the display 204. For example, in at least some example embodiments, the touch-sensitive overlay may extend overtop of a housing 104 (of FIG. 2) which surrounds the display 204. In such example embodiments, the housing 104 (of FIG. 2) may be referred to as an active frame since it is capable of acting as an input interface 206. In at least some example embodiments, the touch-sensitive overlay may extend to the sides of the electronic device 201.

As noted above, in some example embodiments, the electronic device 201 may include a wireless communication subsystem 211 which allows the electronic device 201 to communicate over a wireless network 119. The wireless communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 119 in which electronic device 201 is intended to operate.

In at least some example embodiments, the electronic device 201 may communicate with any one of a plurality of fixed transceiver base stations of the wireless network 119 within its geographic coverage area. The electronic device 201 may send and receive communication signals over the wireless network 119 after the required network registration or activation procedures have been completed. Signals received by the antenna 214 through the wireless network 119 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 119 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 119.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 119. The alternate download path may for example, be used to load an encryption key onto the electronic device 201 through a direct, reliable and trusted connection to thereby provide secure device communication.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 may, in at least some example embodiments, include a near field communications (NFC) subsystem 265. The NFC subsystem 265 is configured to communicate with other electronic devices 201 and/or tags, using an NFC communications protocol. NFC is a set of short-range wireless technologies which typically require a distance of 4 cm or less for communications. The NFC subsystem 265 may include an NFC chip and an NFC antenna.

The electronic device 201 may include a microphone and/or one or more speakers. In at least some example embodiments, an electronic device 201 may include a plurality of speakers 256. For example, in some example embodiments, the electronic device 201 may include two or more speakers 265. The two or more speakers 256 may, for example, be disposed in spaced relation to one another. That is, in at least some example embodiments, the electronic device 201 may include a first speaker and a second speaker and the first speaker and the second speaker may be spatially separated from one another within the electronic device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some example embodiments, each speaker 256 may be associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some example embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 and/or the housing of the electronic device 201. In such example embodiments, the direction of capture of the camera is always predictable relative to the display 204 and/or the housing. In at least some example embodiments, the camera may be provided in a central location relative to the display 204 to facilitate image acquisition of a face.

In at least some example embodiments, the electronic device 201 includes an electromagnetic (EM) radiation source 257. In at least some example embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some example embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images obtained by the camera.

In some example embodiments, the electromagnetic radiation source 257 may be an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 119 is automatically routed to the electronic device 201 using the USB cable or Bluetooth® connection. Similarly, any traffic destined for the wireless network 119 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. The short-range communication subsystem 262 may be used to provide a preferred device mode between the electronic device 201 and another electronic device 201 which may, in at least some example embodiments, be an electronic device 201 which is the same or similar to the electronic device 201 discussed with reference to FIG. 1. In at least some example embodiments, the short-range communication subsystem 262 is a wireless bus protocol compliant communication mechanism such as a Bluetooth® communication module to provide for communication with similarly-enabled systems and devices. Alternatively, in at least some example embodiments, the wireless communication subsystem 211 comprises at least one of the short-range communication subsystem 262 and the NFC subsystem 265.

The electronic device 201 stores data 227 in an erasable persistent memory, which in one example embodiment is the flash memory 244. In various example embodiments, the data 227 includes service data including information required by the electronic device 201 to establish and maintain communication with the wireless network 119. The data 227 may also include user application data such as email messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a text message, an email message, or Web page download will be processed by the wireless communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages; for example, using the input devices in conjunction with the display 204. These composed items may be transmitted through the wireless communication subsystem 211 over the wireless network 119.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and software applications 225.

The software applications 225 on the electronic device 201 may also include a range of additional applications, including a personal information manager (PIM) application having the ability to organize and manage data items relating to the user of the handheld computing device such as, but not limited to, instant message, e-mail, calendar events, voice mails, appointments, and task items. Further including, for example, a social networking application, such as groupware, to access Internet forums, wikis, blogs, social network services, or any combination thereof. Further including, for example, a notepad application, Internet browser application, voice communication (i.e. telephony) application, camera application, video application, mapping application, or a media player application, or any combination thereof. Each of the software applications 225 may include layout information defining the placement of particular fields and graphic elements (e.g. text fields, input fields, icons, etc.) in the user interface (e.g. the display 204) according to the application.

The software modules 221 or parts thereof may be temporarily loaded into volatile memory such as the RAM 246. The RAM 246 is used for storing runtime data variables and other types of data or information, as will be apparent to those skilled in the art. Although specific functions are described for various types of memory, this is merely one example, and those skilled in the art will appreciate that a different assignment of functions to types of memory could also be used.

A predetermined set of applications that control basic device operations, including data and possibly voice communication applications will normally be installed on the electronic device 201 during or after manufacture. Additional applications and/or upgrades to the operating system 223 or software applications 225 may also be loaded onto the electronic device 201 through the wireless network 119, the auxiliary I/O subsystem 250, the data port 252, the short-range communication subsystem 262, or other suitable subsystem 264. The downloaded programs or code modules may be permanently installed; for example, written into the program memory (i.e. the flash memory 244), or written into and executed from the RAM 246 for execution by the processor 240 at runtime.

Figure 2:
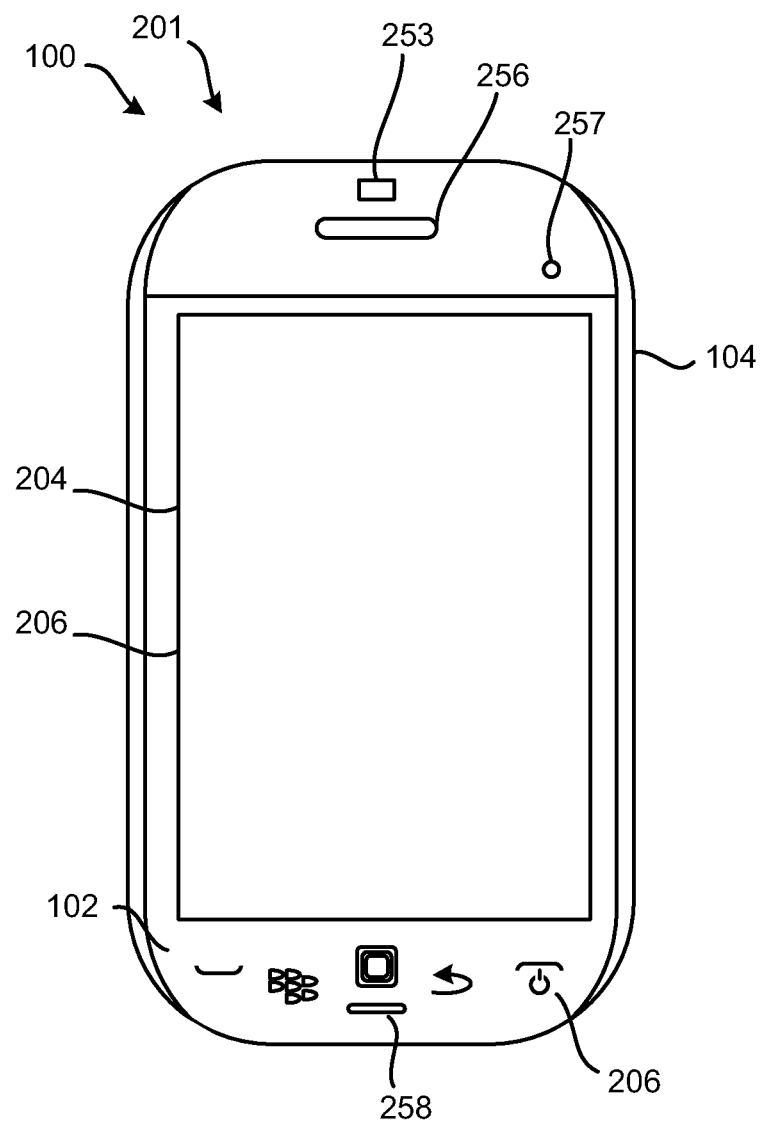
FIG. 2 is an example of an electronic device of the present disclosure, which is a Smartphone or a tablet computer.

Referring now to FIG. 2, a front view of an example electronic device 201 which is a Smartphone 100, or a tablet computer with wireless capabilities, is illustrated. The Smartphone 100 is a mobile phone which offers more advanced computing capability than a basic non-smartphone cellular phone. For example, the Smartphone 100 may have the ability to execute third party applications which are stored on the smartphone.

The Smartphone 100 may include the components discussed above with reference to FIG. 1 or a subset of those components. The Smartphone 100 includes a housing 104 which houses at least some of the components discussed above with reference to FIG. 1.

In the example embodiment illustrated, the smartphone includes a display 204, which may be a touchscreen display which acts as an input interface 206. The display 204 is disposed within the Smartphone 100 so that it is viewable at a front side 102 of the Smartphone 100. That is, a viewable side of the display 204 is disposed on the front side 102 of the smartphone. In the example embodiment illustrated, the display 204 is framed by the housing 104.

The Smartphone 100 also includes other input interfaces 206 such as one or more buttons, keys or navigational input mechanisms. In the example illustrated, at least some of these additional input interfaces 206 are disposed for actuation at a front side 102 of the smartphone.

The Smartphone also includes a speaker 256. In the example embodiment illustrated, the smartphone includes a single speaker 256 which is disposed vertically above the display 204 when the Smartphone 100 is held in a portrait orientation where its height is longer than its width. The speaker 256 may be disposed on the front face of the Smartphone 100.

While the Smartphone 100 of FIG. 2 includes a single speaker 256, in other example embodiments, the Smartphone 100 may include a greater number of speakers 256. For example, in at least some example embodiments, the Smartphone 100 may include a second speaker 256 which is disposed vertically below the display 204 when the smartphone is held in a portrait orientation where its height is longer than its width (i.e. the orientation illustrated in FIG. 2).

The Smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The Smartphone 100 also includes a front facing camera 253 which may be located vertically above the display 204 when the Smartphone 100 is held in a portrait orientation where its height is longer than its width. The front facing camera 253 is located so that it may capture images of objects which are located in front of and/or surrounding the front side of the Smartphone 100.

The Smartphone 100 also includes an electromagnetic radiation source 257. The electromagnetic radiation source 257 is disposed on the front side 102 of the Smartphone 100. In this orientation, electromagnetic radiation which is produced by the electromagnetic radiation source 257 may be projected onto objects which are located in front of and/or surrounding the front side of the Smartphone 100. Such electromagnetic radiation (or the projection of electromagnetic radiation onto objects) may be captured on images obtained by the camera 253.

Figure 3:
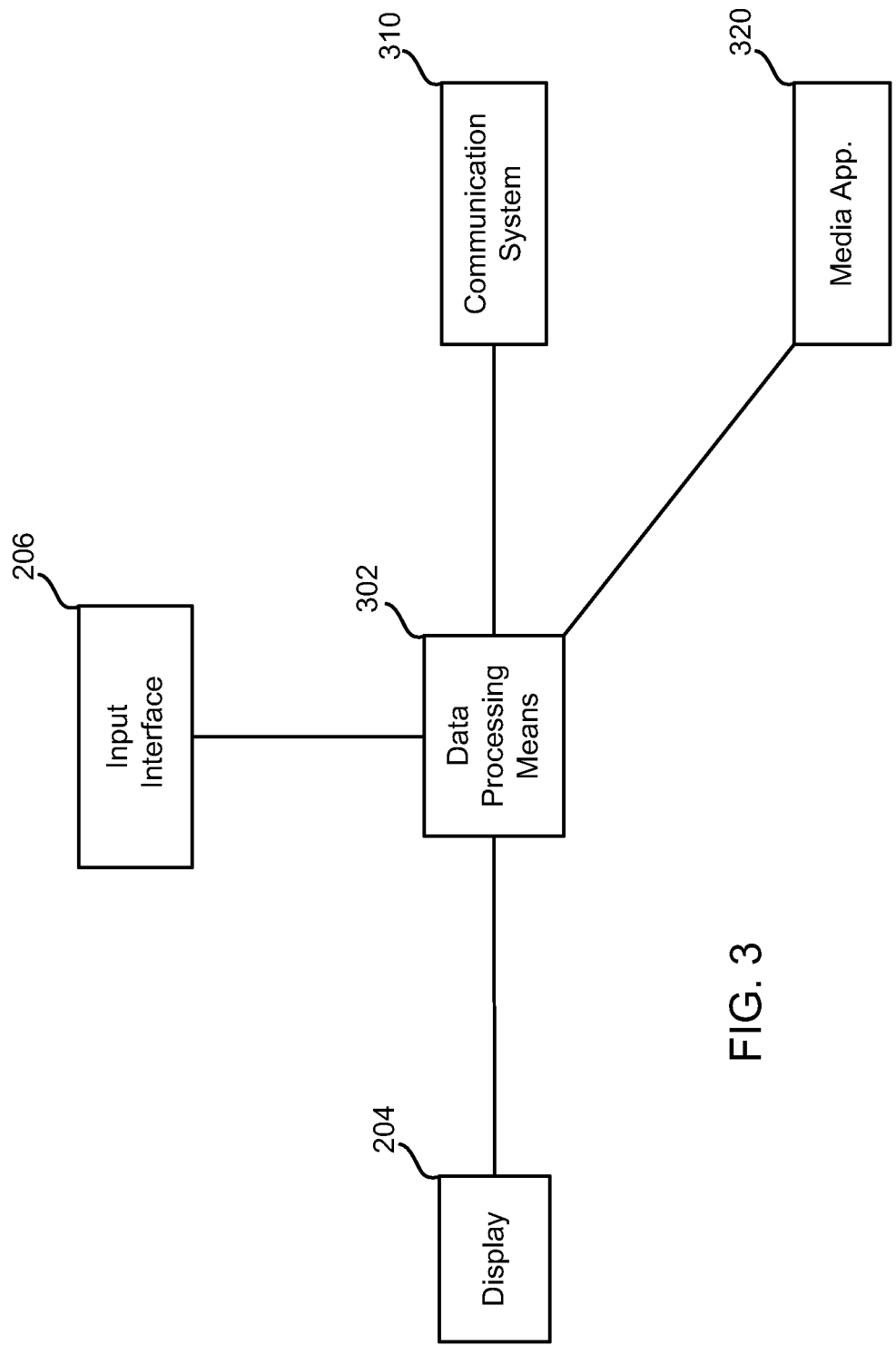
FIG. 3 is a schematic view depicting the communication pathways existing between a data processing means, a display, a input interface and a communication subsystem of the electronic device depicted in FIG. 1.

Referring to FIG. 3, there is shown a schematic view of an example embodiment of the electronic device 211 depicting the communication pathways comprising a data processing means 302 is in communication with the display 204, the input interface 206, a media application 320 and a communication subsystem 310. The communication subsystem 310 comprises the wireless communication subsystem 211, the NFC subsystem 265, and the short-range wireless communication subsystem 262. The data processing means comprises the processor 240, and the memory 244, 246, 248 (disposed within the housing).

The communication subsystem 310 is configurable to switch from a PSM to an AM when communication traffic exceeds a first threshold, and from an AM to a PSM when the communication traffic drops below a second threshold. A threshold is a packet rate comprising at least one of a packets per interval of time and a packets per interval of time for a second interval of time.

The media application 320 is one of the applications 225 and is any of a number of media applications such as movie player, movie downloader, music library downloader, music player, and video chat application. This and many other similar applications which may demand a great deal of capacity from the communication subsystem 310, but which must be provided for a better user experience.

The memory 244, 246, 248 carries computer processing instructions of software modules 221 which, when accessed from the memory 244, 246, 248 and executed by the processor 240, cause the data processing means 302 to perform the method which will be described in further detail below.

Figure 4:
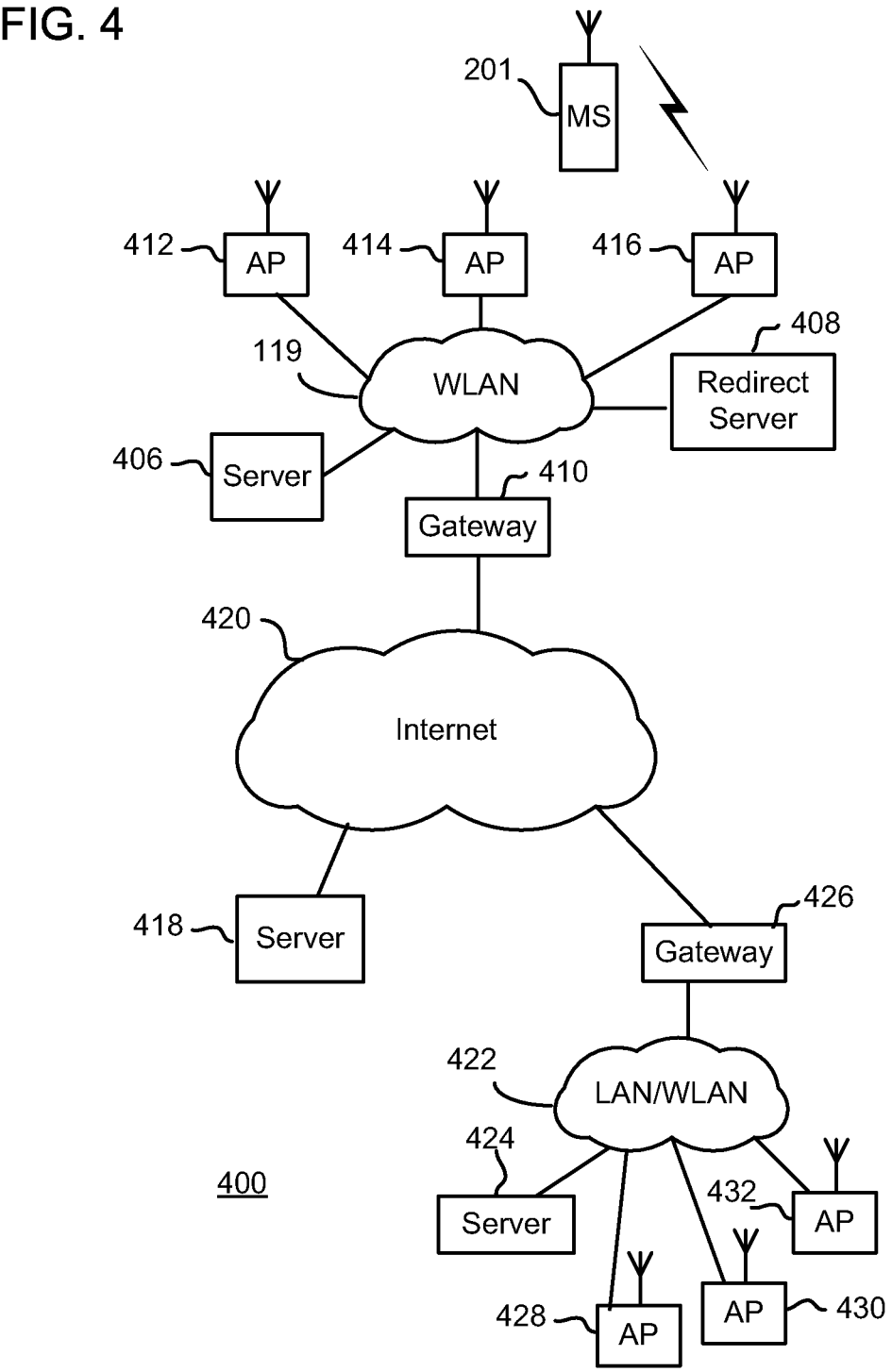
FIG. 4 is an illustrative representation of a communication system which includes wireless communication networks within which an electronic device may operate.

To illustrate one exemplary network architecture within which the techniques of the present disclosure may be practiced, FIG. 4 is a communication system 400 which includes a wireless local area network (WLAN) 119 within which an electronic device 201 may operate. WLAN 119 has a plurality of wireless access points (APs) 412, 414, and 416 for wireless communications with electronic device 201. In the present embodiment, WLAN 119 and electronic device 201 operate in accordance with IEEE 802.11 standards. Such WLANs are identifiable by an electronic device 201 from a Set Service Identifier (SSID) or Extended SSID (ESSID). WLAN 119 also includes one or more servers 406, a redirect server 408, and a gateway 410. Server 406 may provide data, applications, and/or functionality for communication services in WLAN 119.

Electronic device 201 may also operate for communications in different LANs/WLANs, such as WLAN 422. Similar to WLAN 119, WLAN 422 has a plurality of wireless APs 428, 430 and 432, one or more servers 424, and a gateway 426. In this embodiment, WLAN 422 is a private communication network of an enterprise (small company, corporation, etc.) associated with electronic device 201. Such WLANs 119 and 422 may provide or allow access to various data and communication services to its terminals. For example, the WLANs may provide for access to Internet 420 via the Web browser application, or voice telephony communication services with use of Voice over IP (VoIP) communications or other techniques.

For data or message synchronization services, electronic device 201 is enabled to maintain data synchronization with a server (e.g. server 406 or 418) for user data of an application associated with a user account. The application of electronic device 201 and the server may be or include, for example, an electronic mail (e-mail) application program for the communication of e-mail messages. In this case, the data synchronization is a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program or multi-media (for example video, music, and images) synchronization for media files in media applications.

For the data-synchronized communications, the server maintains storage of a mapping of a user account name or identifier of the user account with a personal identification number of electronic device 201. When communications are required with electronic device 201, the personal identification number is used to route the messages to/from electronic device 201 through communication system 400.

In contrast to WLAN 422, WLAN 119 may be a public WiFi "hotspot" for public use and include what is referred to as a "captive portal" or "walled garden." For devices connected in WLAN 119 via one of wireless APs 412, 414, and 416, gateway 410 is configured to permit or deny access to the data, applications, and/or functionality, as well as to permit or deny external access outside of WLAN 119 to Internet 420. To do this, gateway 410 has a set of IP address filters which define a set of addresses that are permissible/impermissible, if any at all, for access by devices. Access by a device depends on whether or not a device has been authorized and what access rights are given upon authorization.

Typically, when a request by a device in WLAN 119 is made prior to proper authorization, gateway 410 is configured to redirect the request to redirect server 408. In response, redirect server 408 is configured to respond to electronic device 201 to provide data for producing information (e.g. a Web page information) which is rendered in a visual display of electronic device 201 via a Web browser application. The information may solicit a user response. For example, the information may solicit a user registration or login with user fields for entering a user name and/or password information. As another example, the information may solicit a user payment with user payment fields for entering in user payment information. Further, the information may solicit a user acceptance of terms of use, a license, or a legal disclaimer (options of "YES" or "NO", or "ACCEPT" or "DECLINE"). Redirect server 408 may be referred to by a different name depending on any more specific purpose (e.g. authentication server, registration server, user confirmation server, etc.).

The user will enter a user response via the Web browser application, for example, which is sent by electronic device 201 and received by gateway 410. Gateway 410 identifies whether the received user response is sufficient (e.g. whether the user name and password match prestored user name and password information, whether the user payment is accepted, whether the user acceptance is confirmed, etc.). If the user response is deemed sufficient, gateway 410 permits access to the data, applications, and/or functionality in or outside of WLAN 119.

Again, in contrast to WLAN 119, WLAN 422 may be a private communication network of an enterprise associated with electronic device 201. For devices attempting to access WLAN 422 via Internet 420, gateway 426 is configured to permit or deny internal access to the data, applications, and/or functionality in WLAN 422. For devices connected in WLAN 422 via one of wireless APs 428, 430, and 432, gateway 426 may be configured to permit or deny access to the data, applications, and/or functionality offered via WLAN 422 depending on whether or not a device has been authorized and what access rights are given upon authorization.

In a WLAN, the area of AP may include several terminals (Stations or STA), which can communicate with the whole network via the AP. If there is only one AP, then the network is called a Basic Service Set (BSS) WLAN. If the network contains several BSS sets, which together form a sub-network, then this is called an Extended Service Set (ESS)

WLAN. A bus between APs in the ESS networks is called a Distribution System (DS), which can be for instance an Ethernet system or a wireless system. The area covered by one AP is called a microcell. A WLAN comprising a distribution system, APs with their microcells presents itself as one network of the IEEE802 standard to the higher layers of the OSI layer model.

FIGS. 5 to 8 are flowcharts for use in describing embodiments for controlling power consumption of the communication subsystem 310 in the electronic device 201 of FIGS. 1 to 4. They describe an improved balance between power consumption and performance through, including, dynamic traffic thresholds to save power when the device 201 is in idle or a lower traffic state. The techniques described in relation to the flowcharts may be performed by one or more controllers or processors (e.g. controller or microprocessor) of the electronic device 201. A computer program product which may embody the technique may include a computer readable medium (e.g. memory or computer disk) having computer instructions stored therein which are executable by the one or more controllers or processors for performing the technique.

The electronic device 201 is initially located within a coverage cell of a wireless communication network, such as a wireless local area network (WLAN). A connection between the device 201 and the WLAN is established and maintained via an access point (AP) of the WLAN, where communications are provided for the electronic device 201 over a communication channel. The electronic device 201 may receive one or more services made available by the WLAN. The services may include a voice telephony service (e.g. VoIP) and/or a data communication service (e.g. Web browsing service, data synchronization service, e-mail message delivery service, etc., facilitated via a packet data communication service). The communications over the communication channel is in packet data and the speed or bandwidth of the communications is communication traffic, typically, measured in packets per interval of time for example, packet per sec or packets per millisecond.

Figure 5:
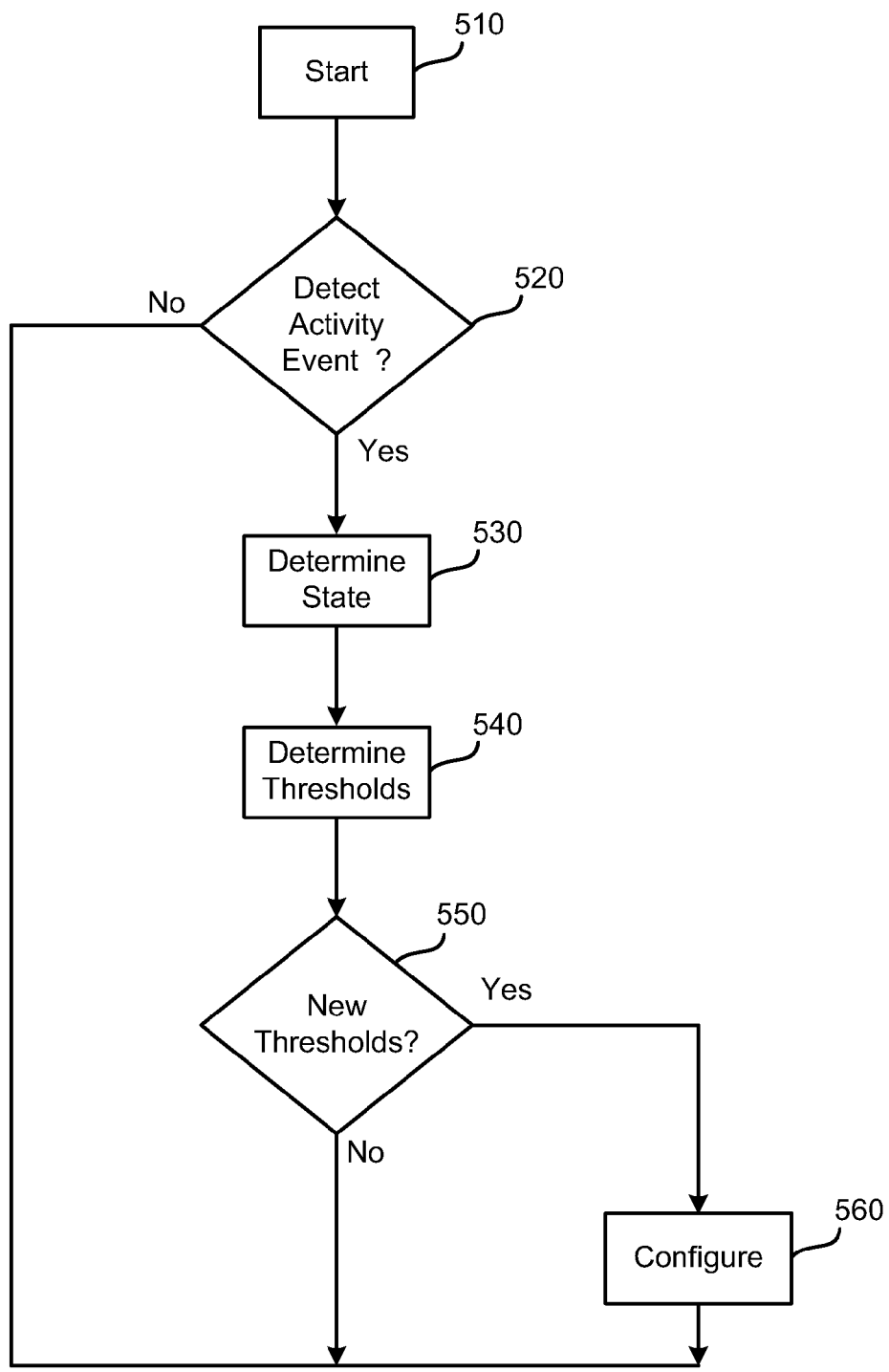
FIG. 5 is a flowchart for describing a method for controlling power consumption in an electronic device with a communication subsystem.

Referring to FIG. 5, there is shown a flowchart of a method to control power consumption in electronic device 201 with communication subsystem 310, in accordance with an example embodiment of the present disclosure. At block 510, the electronic device 201 is enabled with the communication subsystem 310 configured in PSM. The communication subsystem 310 also configured or set to switch from the PSM to AM when the communication traffic exceeds a first threshold of, for example, 20 packets per second; and to switch from AM to PSM when the communication traffic drops below a second threshold, for example, of 10 packets per second. In an alternate embodiment, for better performance, the communication subsystem 310 may set to switch from AM to PSM when the communication traffic drops below a second threshold for a second interval of time, for example: less then 10 packets per second for 5 minutes.

At block 520, the electronic device 201 is set to detect an activity event and when detected, the activity event is provided to block 530. One activity event comprises one of display activated (on), display deactivated (off), web browser application activated (opened), web browser application deactivated (closed), social network application activated (opened), social network application deactivated (closed), game activated (opened), game deactivated (closed), telephone application activated (opened), and telephone application deactivated (closed). For greater clarity, an application being deactivated or closed includes the processor 240 executing the application in a background state where its process is kept around in the background, allowing it to continue working (for example downloading web pages) if needed, and coming to the foreground if a user returns to it. Although specific activity events are described, these are merely examples, and it is appreciated that there are other activity events which may affect the communication subsystem 310 and may be of interest for monitoring.

At block 530, the electronic device 201 stores the detected activity event and determines a state. The activated or deactivated state of the applications 225 and the components, for example, display 206 and Input Interface 206 of the electronic device 201 at any one time is a particular state. One state of the electronic device 201 is display activated and the other activity events deactivated. Another state is display activated, web browser application activated, and the other activity events deactivated. It is appreciated that there are a number of other combinations of activity events for different states. Each state is an indication of possible upcoming increases or decreases in communication traffic for the communication subsystem 310.

At block 540, the state of the electronic device 201 is associated with a setting for the first threshold and another setting for the second threshold. The setting for the first threshold and the second threshold is determined from a lookup table of states and their associated settings for the first threshold and the second threshold. Although a lookup table being used to determine the associated settings is described, this is merely one example; there are other methods of determining the same such as by computing the settings based on a formula or algorithm approximating the data in the lookup table. It will be appreciated that the data in the lookup table may be determined by a number of different methods such as trying different settings for the desired balance of performance and power conservation, or calculating the settings based on anticipated communication traffic for active applications, or using both example methods.

The settings for the first threshold and the second threshold are dependent on the desired performance for the electronic device 201. For example, where the preference is for the electronic device 201 to have maximum performance in terms of packet throughput and low latency, and limited power conservation; then the first threshold may be set to a performance setting with a relatively low packet rate. The communication subsystem 310 would switch to AM earlier then where there is a preference for power conservation. When the preference is for power conservation then the first threshold may be set a relatively high packet rate so that the electronic device 201 would stay in PSM longer before switching to AM as the communication traffic increases. As a middle ground, the first threshold may be set at middle packet rate between the performance setting and the power conservation setting. Although three levels of preferences between performance and power saving are described; in alternative embodiments, there may be any number of granularities between the performance setting and the power conservation setting.

As a further example, for a performance setting, the second threshold may be set relatively much lower then the first threshold so that the communication traffic would drop much lower then the first threshold before the communication subsystem 310 switches from AM to PSM. For a power conservation setting, the second threshold may be set higher then the performance setting second threshold so that the communication traffic would not have to drop as much before the communication subsystem 310 switches from AM to PSM. As a middle ground, the second threshold may be set at middle packet rate between the performance setting and the power conservation setting. Although three levels of preferences between performance and power saving are described; in alternative embodiments, there can any number of granularity between the performance setting and the power conservation setting.

Referring again to block 540, the setting for the first threshold and the setting for the second threshold are in packets per interval, or packet rate, of communication traffic. In certain states of the electronic device 201, there may be a preference for more responsiveness to increasing or decreasing communication traffic. In such cases, the interval of measurement is decreased. For example, the packets per interval is set at 2 packets per 100 milliseconds instead of 20 packets per second. In another example, the packets per interval is set at 20 packets per second instead of 200 packets per 10 seconds. While the normalize packet rate of 20 packets per second is the same for all settings, the packet rate of 2 packets per 100 milliseconds has a faster response to increasing communication traffic and for earlier switching from PSM to AM with better performance at the cost of power usage.

The packet rate of 200 packets per 10 seconds has slower response to increasing communication traffic as it takes 10 seconds to measure the rate and it measures the average rate over 10 second intervals. Over a particular 10 second interval, the communication traffic may be bursty in that a particular 2 second time may have a 30 packets per second rate, but may still be under 200 packets per 10 seconds as the packet rate over the other 8 seconds may be much lower; the communication subsystem 310 would then not switch from PSM to AM, thereby saving power. If the first threshold had been set at 20 packets per second intervals instead of 200 packets per 10 seconds then over this same 10 second interval, the communication subsystem 310 would have switched from PSM to AM for at least part of the 10 second interval.

In a further example embodiment, the first threshold and the second threshold are set as a packet rate over a second interval of time. In the above example, while the packet rate of 200 packets per 10 seconds is mathematically similar to 20 packets per second over 10 seconds, the effect on the communication subsystem 310 for that 10 second period of time may be different. The packet rate of 20 packets per second over 10 seconds means that the communication traffic must be at least 20 packets per second over each second of the 10 seconds. In a state where performance is desired, the second threshold may, for example, be set at 20 packets per second over 10 second to further ensure that the communication traffic of the communication subsystem 310 has reduced below 20 packets per second over 10 second with greater certainty before switching from AM to PSM. In alternate embodiments, the second interval of time may be set at a relative long time such as 5 minutes.

At 550, the electronic device 201 checks whether settings for the first threshold and the second threshold from block 540 are the same as the first threshold and the second threshold currently set for the communication subsystem 310 to switch from AM to PSM and from PSM to AM. Where settings are not the same, the communication subsystem 310 is then configured with the settings for the first threshold and the second threshold from block 540 at block 560. The electronic device 201 then waits further detection of new activity events at block 520.

It will be appreciated that example electronic devices like device 201 may be configured with states ranging from two to very large numbers and such devices do not depart from the scope of this application. It will also be appreciated that activated events and deactivated events are not binary and that each of the activated events and deactivated events may cover a range of events without departing from the scope of the application.

Figures 6, 7:
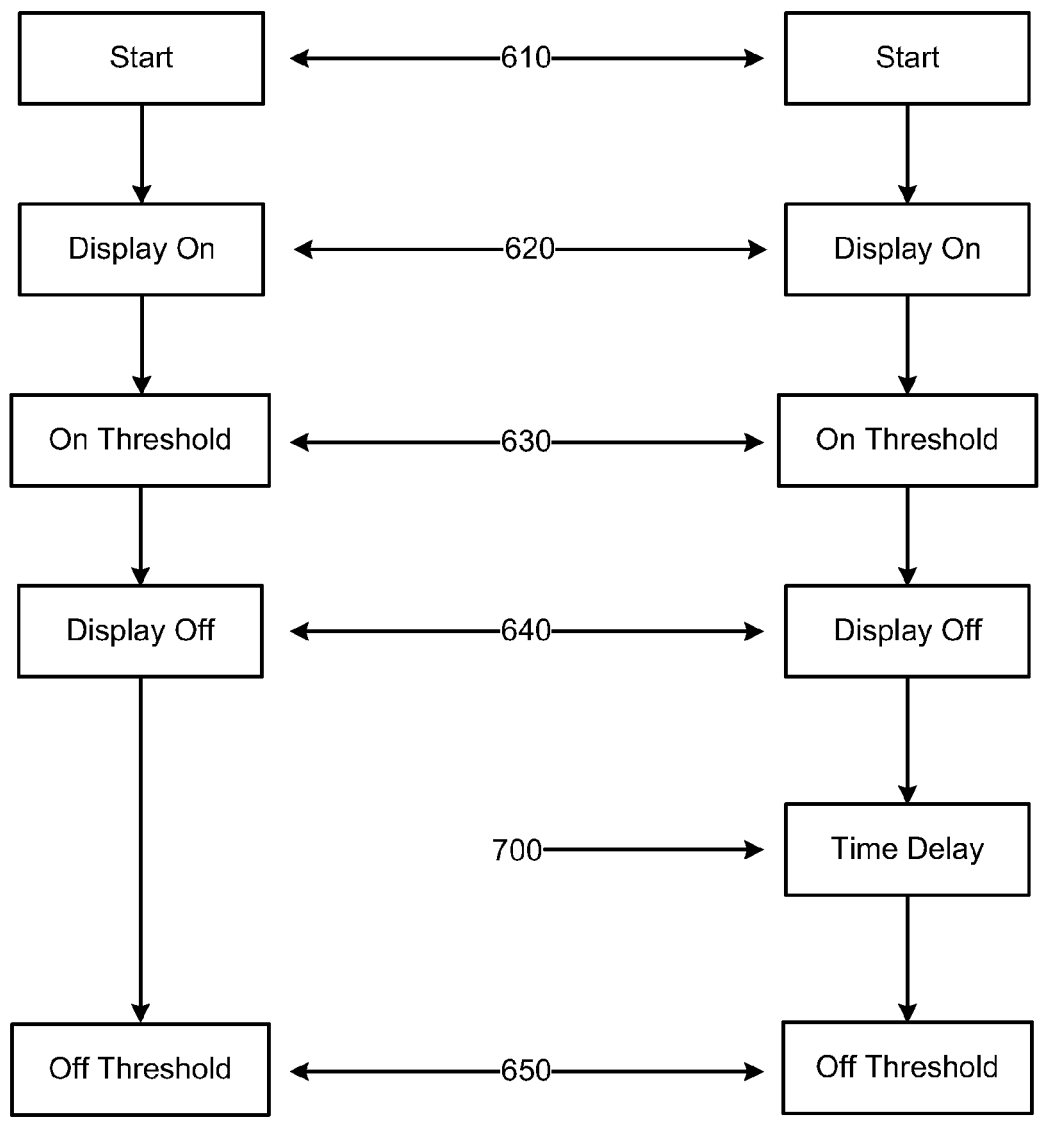
FIG. 6 is a flowchart for describing an example embodiment of a method for controlling power consumption of an communication subsystem in an electronic device having two states.
FIG. 7 is a flowchart for describing an alternate example embodiment of a method for controlling power consumption of an communication subsystem in an electronic device having two states.

Referring to FIG. 6, there is shown an example embodiment of a method for controlling power consumption of the communication subsystem 310 in the electronic device 201 having two states. Beginning at a start block 610, the display 204 is in a deactivated or off state where the communication subsystem 310 is configured with a first threshold of 20 packets per second for switching from PSM to AM, and a second threshold of 15 packets per second for switching from AM to PSM.

At block 620, an activity event is detected, the display 204 is turned on or activated. The electronic device 201 is now in an activated or on state. For clarity, the electronic device 201 may have numerous other events occurring at this time or any other time, but such events are not used to determine the states for the purpose of setting the first threshold and the second threshold.

At block 630, for the display activated or on state, the first threshold is set at 2 packets per 100 milliseconds and the second threshold is set at 10 packets per 100 milliseconds with the communication subsystem 310. By changing the measurement interval to a shorter 100 milliseconds, the communication subsystem 310 is able to respond faster to increases in communication traffic. It is typically expected, for the display on state, that the electronic device 201 is being used by a user where applications, such as, the web browser may be activated at any time to access the Internet. The communication subsystem 310 should then be positioned to better respond for such events to improve performance.

At block 640, another activity event is detected, the display 204 is deactivated or turn off. The electronic device 201 is now in an activated or on state and, at block 650, the communication subsystem 310 is again configured with a first threshold of 20 packets per second for switching from PSM to AM, and a second threshold of 15 packets per second for switching from AM to PSM. The electronic device 201 then waits for detection of the display 204 being turned on or activated at block 620. It will be appreciated that the display 204 of the electronic device 201 will flip-flop over time between the display activated state and the display deactivated state, and that the thresholds will also change accordingly.

It will be appreciated that the packet rates specified for electronic devices with various features and functions may have different threshold packet rates from those in the present example embodiment.

Referring to FIG. 7, there is shown an alternate example embodiment of a method for controlling power consumption of the communication subsystem 310 in the electronic device 201 having two states. As shown, the blocks 610 to 650 are the same as those referred to in FIG. 6. A time delay for a period of time, such as five minutes, at block 700 is added before the communication subsystem 310 is again configured with a first threshold of 20 packets per second for switching from PSM to AM, and a second threshold of 15 packets per second for switching from AM to PSM (block 650). The time delay block 700 is not added when the display 204 is activated from the deactivated state.

While the display 204 changing from the activated state to the deactivated, or turned off, state typically indicates that the user has stopped using the electronic device 201; it is also frequently not true as a screensaver application may have turned off the display 204 due to momentary user inaction with the Input Interface 206 and the user may momentarily activate the display 204 again. This does not generally occurred for displays being activated from deactivated states. It is advantageous to have a time delay to account for such momentary user inaction and other similar flip-flops between activated to deactivated states.

Figure 8:
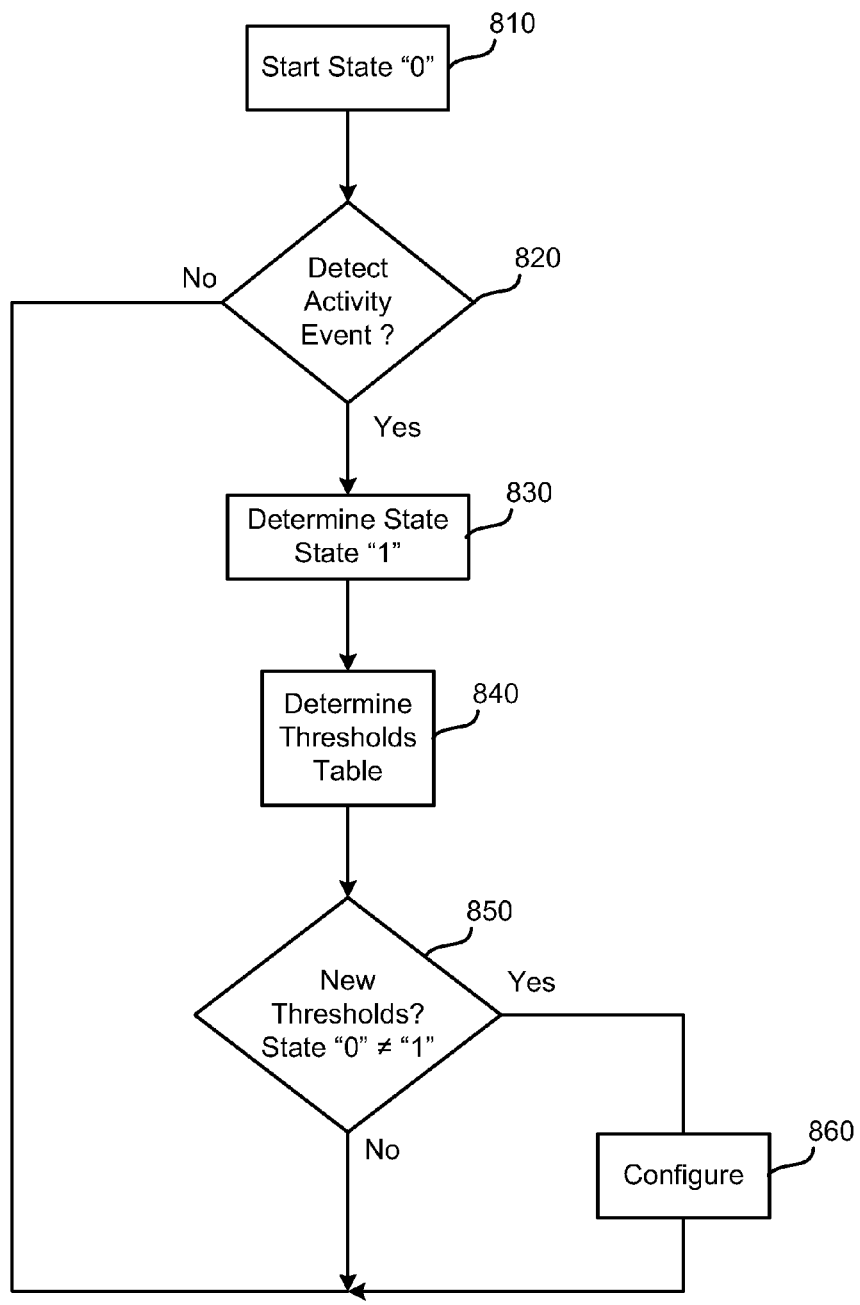
FIG. 8 is a flowchart for describing an example embodiment of a method for controlling power consumption of a communication subsystem in an electronic device having four states.

Referring to FIG. 8, there is shown an example embodiment of a method for controlling power consumption of the communication subsystem 310 in the electronic device 201 having four states associated with monitoring the display 204 and the media application 320. For illustration, the communication subsystem 310 has a WLAN IEEE 802.11n radio with four transmit-and-receive chains (4 radios), and is enable with Dynamic MIMO power save. The communication subsystem 310 includes four power levels with 4×4 (four radio mode) with the highest power usage and highest performance, 3×3 (three radio mode), 2×2 (two radio mode), and 1×1 (one radio mode) the lowest power usage and lowest performance. The communication subsystem 310 is further connected to an 802.11n access point with similar 4×4 capabilities and supporting Dynamic MIMO power save.

Beginning at a start block 810, the display 204 is in a deactivated or off state and the media application 320 also deactivated or off; wherein the communication subsystem 310 is configured with a first threshold of 20 packets per second for switching from PSM in one radio mode AM in two radio mode, and a second threshold of 10 packets per second for switching from AM in two radio mode to PSM in one radio mode. Referring to a lookup table in Table 1, this is state "0" for the electronic device 201.

TABLE 1

| State of device 201 | Display 204 | Media App | First Threshold packets/sec | Second Threshold packets/sec | AM | PSM |
|---|---|---|---|---|---|---|
| 0 | deactivated | deactivated | 20 | 10 | 2 × 2 | 1 × 1 |
| 1 | activated | deactivated | 30 | 20 | 3 × 3 | 2 × 2 |
| 2 | activated | activated | 40 | 20 | 4 × 4 | 2 × 2 |
| 3 | deactivated | activated | 40 | 10 | 4 × 4 | 2 × 2 |

In this state "0", the electronic device 201 is limited to a maximum of two radio mode (2×2) packet rates of communication traffic for tasks when a user is not actively using the electronic device 201 such as synchronization with various services as shown in FIG. 4.

At block 820, the electronic device 201 is set to detect an activity event and when detected, the activity event is provided to block 830. For illustration, the display 204 being activated or turned on is detected. For clarity, the electronic device 201 may have numerous other events, not related to either the display 204 or the media application 320, occurring at this time or any other time, but such events are not used to determine the states for the purpose of setting the first threshold and the second threshold.

At block 830, the electronic device 201 stores the detected activity event and determines a state. For illustration, the current state before block 820 is "0" and with the detected activity event, the state of device 201 is now "1" from the lookup table of Table 1.

At block 840, the state of the electronic device 201 is associated with a setting for the first threshold and another setting for the second threshold. Referring again to the lookup table of Table 1, for state "1", the settings are a first threshold of 30 packets per second for switching from PSM in two radio mode to AM in three radio mode and a second threshold of 20 packets per second for switching from AM in three radio mode to PSM in two radio mode.

At block 850, the electronic device 201 checks whether settings for the first threshold and the second threshold from block 840 are the same as the first threshold and the second threshold currently set for the communication subsystem 310. For this example, state "0" and state "1", the thresholds are different.

At block 860, the communication subsystem 310 is configured with the first threshold of 30 packets per second for switching from PSM in two radio mode to AM in three radio mode and the second threshold of 20 packets per second for switching from AM in three radio mode to PSM in two radio mode.

The electronic device 201 then waits at block 820 to detect the next activity event. If the next detect activity event is the media application 320 being activated then the state becomes "2". If the next detect activity event is the display 204 being deactivated then the state becomes "0". It will be appreciated that the state of electronic device 201 changes state as per Table 1 as the monitored display 204 and media application 320 activate and deactivate.

Referring again to the lookup table of Table 1, it is an example of an improved balance between power consumption and performance through, including, dynamic traffic thresholds to save power when the device 201 is in idle or a lower traffic state. The device 201 is in PSM until more resources (or bandwidth) are desired from the communication system 310 for better performance. If the first threshold for AM is not crossed then the communication traffic may be throttled (limited) by the PSM available bandwidth and thereby lowering the performance of device 201 for lower power consumption.

In state "0" both display 204 and media application 320 are off, this indicates that the device 201 is not being used. The communication subsystem 310 is then set in the lowest power state with the PSM in one radio mode. However, as there may be many background tasks, such as the synchronizations shown in FIG. 4, the device 201 is provided with the AM in two radio mode with more available bandwidth when and if there is the demand (communication traffic increases).

In state "1", the display 204 is on but the media application 320 is off. This indicates that the device 201 is being used by the user and that more resources (bandwidth) and performance may be demanded from the communication subsystem 310 as more applications 225 are started. However, full resources are not needed as the media application 320 has not been started. The communication subsystem 310 is then set in a more performance state where the PSM in two radio mode, and the AM in three radio mode with more available bandwidth when and if there is the demand.

In state "2", the display 204 is on and the media application 320 is on. This indicates that the device 201 is being used by the user. It also means that the media application 320 may demand the maximum bandwidth from the communication subsystem 310 for the transfers of large amounts of media data. However, the need for full resources is only contingent on the user actually using the media application 320 for such media transfers, for example watching a HD movie. The communication subsystem 310 is then set in a more performance state where the PSM in two radio mode, and the AM in four radio mode with the most available bandwidth for when and if there is the demand.

In state "3", the display 204 is off and the media application 320 is on. This indicates that the device 201 may be in uses by the user, but the user may have momentarily stepped away. It also means that the media application 320 may still demand the maximum bandwidth from the communication subsystem 310 for the transfers of large media data. The communication subsystem 310 is then set with the same settings as state "2" as the user may momentarily return to the media application 320.

It will be appreciated to those skilled in the art that the packet rates, and the radios for AM and PSM, specified for electronic devices with various features and functions may be different from those specified in the present example embodiment.

Thus, techniques for use in facilitating an improved balance between power consumption and performance of an electronic device have been described herein. An electronic device with a communication subsystem having a power save mode and an active mode is configured to setting a first threshold of communication traffic for switching from the power saving mode to the active mode; setting a second threshold of communication traffic for switching from the active mode to the power saving mode; detecting an activity event on the electronic device; and setting at least one of the first threshold and the second threshold to the communication traffic associated with the activity event.

In another embodiment, an electronic device with a communication subsystem having a power save mode and an active mode, and a display, is configured to setting a first threshold of communication traffic for switching from the power saving mode to the active mode; setting a second threshold of communication traffic for switching from the active mode to the power saving mode; detecting one of display activated state and display deactivated display state; and setting at least one of the first threshold and the second threshold to the communication traffic associated with the detected one of the display activated state and the display deactivated display state.

In still another embodiment, an electronic device with a communication subsystem having a power save mode and an active mode is configured to setting a first threshold of communication traffic for switching from the power saving mode to the active mode; setting a second threshold of communication traffic for switching from the active mode to the power saving mode; detecting an activity event on the electronic device; and setting at least one of the first threshold and the second threshold to the communication traffic associated with the activity event. The activity event is associated with a state of the electronic device and, alternatively or additionally, at least one of the first threshold and the second threshold has a shorter interval of measurement between a first state and a second state. Alternatively, or additionally, at least one of the active mode and the power saving mode comprises one setting within a range of power levels. Alternatively, or additionally, the setting of at least one of the first threshold and the second threshold to the communication traffic associated with the activity event is delayed for a period of time.

In yet another embodiment, an electronic device with a communication subsystem having a power save mode and an active mode, and a display, is configured to setting a first threshold of communication traffic for switching from the power saving mode to the active mode; setting a second threshold of communication traffic for switching from the active mode to the power saving mode; detecting one of display activated state and display deactivated display state; and setting at least one of the first threshold and the second threshold to the communication traffic associated with the detected one of the display activated state and the display deactivated display state. The first threshold comprises a first packets per interval, and the second threshold comprises a second packets per interval where at least one of the first threshold and the second threshold has a shorter interval of measurement between the activated display state and the deactivated display state. Alternatively or additionally, at least one of the active mode and the power saving mode comprises one setting within a range of power levels. Alternatively or additionally, the setting of at least one of the first threshold and the second threshold to the communication traffic associated with the detected one of the display activated state and the display deactivated display state is delayed for a period of time when the display goes from the display activated state to the display deactivated state.

While the steps of the methods are shown as occurring in a particular order, it will be appreciated by those skilled in the art that many of the steps are interchangeable and may occur in different orders than that shown without materially affecting the end results of the methods.

The above-described embodiments of the present disclosure are intended to be examples only. Those of skill in the art may effect alterations, modifications and variations to the particular embodiments without departing from the scope of the application. The invention described herein and in the recited claims are intended to cover and embrace all suitable changes in technology.

What is claimed is:

1. A method of controlling a communication subsystem in an electronic device between a power saving mode and an active mode, a first threshold of communication traffic being defined for switching from the power saving mode to the active mode and a second threshold of communication traffic being defined for switching from the active mode to the power saving mode, the method comprising:
   detecting an activity state of the electronic device, the detected activity state being one of a plurality of defined activity states, the defined activity states each being defined by activation or deactivation of at least one application or component of the electronic device, wherein each defined activity state is associated with a corresponding anticipated level of communication traffic; and
   changing at least one of the first threshold and the second threshold based on the detected activity state, wherein the first threshold comprises a first packets per interval, and the second threshold comprises a second packets per interval, and wherein the first packets per interval is greater than the second packets per interval.

2. A method of claim 1, further comprising switching the communication subsystem to the power saving mode when the communication traffic is below the second threshold; and switching the communication subsystem to the active mode when the communication traffic is above the first threshold.

3. A method of claim 1, wherein the plurality of activity states are each defined by at least one of display activated, display deactivated, input interface activated, input interface deactivated, media application activated, media application deactivated, browser activated, browser deactivated, social network application activated, social network application deactivated, game activated, game deactivated, telephone application activated, and telephone application deactivated.

4. A method of claim 1, wherein at least one of the first threshold and the second threshold has a shorter interval of measurement when a first activity state is detected than when a second activity state is detected.

5. A method of claim 1, wherein the communication subsystem is a Wireless Local Area Network (WLAN) radio compliant with at least one of an IEEE 802.11b standard, an IEEE 802.11a standard, an IEEE 802.11g standard, an IEEE 802.11n standard, a WiMax standard, a Bluetooth standard, and a Near Field Communication standard.

6. A method of claim 1, wherein at least one of the active mode and the power saving mode comprises one setting within a range of power levels.

7. A method of claim 6, wherein the one setting is changed based on the detected activity state.

8. A method of claim 1, wherein the changing is delayed for a period of time.

9. A method of claim 1 wherein the plurality of defined activity states are each defined by a combination of activation or deactivation of two or more applications or components of the electronic device.

10. A non-transitory machine readable medium having tangibly stored thereon executable instructions for performing a method of controlling a communication subsystem between a power saving mode and an active mode, a first threshold of communication traffic being defined for switching from the power saving mode to the active mode and a second threshold of communication traffic being defined for switching from the active mode to the power saving mode, wherein the executable instructions, when executed by one or more processors of the electronic device, cause the electronic device to:
  detect an activity state of the electronic device, the detected activity state being one of a plurality of defined activity states, the defined activity states each being defined by activation or deactivation of at least one application or component of the electronic device, wherein each defined activity state is associated with a corresponding anticipated level of communication traffic; and
  change at least one of the first threshold and the second threshold based on the detected activity state, wherein the first threshold comprises a first packets per interval, and the second threshold comprises a second packets per interval, and herein the first packets per interval is greater than the second packets per interval.

11. An electronic device, comprising:
  one or more processors;
  a memory coupled to the one or more processors, wherein the memory tangibly stores executable instructions;
  a communication subsystem having a power saving mode and an active mode, a first threshold of communication traffic being defined for switching from the power saving mode to the active mode and a second threshold of communication traffic being defined for switching from the active mode to the power saving mode;
  wherein the executable instructions, when executed by the one or more processors, cause the electronic device to:
    detect an activity state of the electronic device, the detected activity state being one of a plurality of defined activity states, the defined activity states each being defined by activation or deactivation of at least one application or component of the electronic device, wherein each defined activity state is associated with a corresponding anticipated level of communication traffic; and
    change at least one of the first threshold and the second threshold based on the detected activity state, wherein the first threshold comprises a first packets per interval, and the second threshold comprises a second packets per interval, and wherein the first packets per interval is greater than the second packets per interval.

12. An electronic device of claim 11, wherein the one or more processors are further configured to:
  switch the communication subsystem to the power saving mode when the communication traffic is below the second threshold; and
  switch the communication subsystem to the active mode when the communication traffic is above the first threshold.

13. An electronic device of claim 11, wherein the plurality of activity states are each defined by at least one of display activated, display deactivated, input interface activated, input interface deactivated, media application activated, media application deactivated, browser activated, browser deactivated, social network application activated, social network application deactivated, game activated, game deactivated, telephone application activated, and telephone application deactivated.

14. An electronic device of claim 11, wherein at least one of the first threshold and the second threshold has a shorter interval of measurement when a first activity state is detected than when a second activity state is detected.

15. An electronic device of claim 11, wherein the communication subsystem is a Wireless Local Area Network (WLAN) radio compliant with at least one of an IEEE 802.11b standard, an IEEE 802.11a standard, an IEEE 802.11g standard, an IEEE 802.11n standard, a WiMax standard, a Bluetooth standard, and a Near Field Communication standard.

16. An electronic device of claim 11, wherein at least one of the active mode and the power saving mode comprises one setting within a range of power levels.

17. An electronic device of claim 16, wherein the one setting is changed based on the detected activity state.

18. An electronic device of claim 11, wherein the change is delayed for a defined period of time.

19. An electronic device of claim 11, wherein the plurality of defined activity states are each defined by a combination of activation or deactivation of two or more applications or components of the electronic device.

* * * * *